United States Patent
Vadura et al.

(10) Patent No.: US 9,734,492 B2
(45) Date of Patent: Aug. 15, 2017

(54) SECURE UNIVERSAL TWO-STEP PAYMENT AUTHORIZATION SYSTEM

(71) Applicants: Dennis Vadura, Trabuco Canyon, CA (US); Wei Kang Tsai, Irvine, CA (US)

(72) Inventors: Dennis Vadura, Trabuco Canyon, CA (US); Wei Kang Tsai, Irvine, CA (US)

(73) Assignee: Badu Networks, Inc., Irvine, CA (US)

( * ) Notice: Subject to any disclaimer, the term of this patent is extended or adjusted under 35 U.S.C. 154(b) by 192 days.

(21) Appl. No.: 14/271,835

(22) Filed: May 7, 2014

(65) Prior Publication Data

US 2015/0324794 A1 Nov. 12, 2015

(51) Int. Cl.
*G06Q 20/00* (2012.01)
*G06Q 20/20* (2012.01)
*G06Q 20/32* (2012.01)
*G06Q 20/42* (2012.01)

(52) U.S. Cl.
CPC .......... *G06Q 20/20* (2013.01); *G06Q 20/202* (2013.01); *G06Q 20/32* (2013.01); *G06Q 20/322* (2013.01); *G06Q 20/3274* (2013.01); *G06Q 20/42* (2013.01)

(58) Field of Classification Search
CPC .................................................. G06Q 20/105
USPC ................................ 705/5, 6, 14.51, 16, 44
See application file for complete search history.

(56) References Cited

U.S. PATENT DOCUMENTS

| | | | | |
|---|---|---|---|---|
| 2010/0088193 | A1* | 4/2010 | White | G06Q 30/0601 705/26.1 |
| 2011/0208659 | A1* | 8/2011 | Easterly | G06Q 20/027 705/79 |
| 2011/0251892 | A1* | 10/2011 | Laracey | G06Q 30/0253 705/14.51 |
| 2012/0011007 | A1* | 1/2012 | Blewett | G06Q 20/20 705/16 |
| 2012/0245985 | A1* | 9/2012 | Cho | G06Q 20/16 705/14.23 |
| 2013/0124412 | A1* | 5/2013 | Itwaru | G06Q 20/322 705/44 |

* cited by examiner

*Primary Examiner* — Rokib Masud

(57) ABSTRACT

A system and methods expedite and make secure payment data entry, and payment and authorization and authorization, for both in-store and online purchases. A mobile app, or widget or browser extension or installed service, on a mobile communication device, generates a barcode to be scanned at a point-of-sale terminal. Optional confirmation is sent to an app, or browser extension or widget or installed service, on a mobile or fixed communication device, to confirm a purchase. An independent app, or browser extension or widget or installed service, on a mobile or fixed communication device, generates a barcode that is sent directly to an online point-of-sale system. The method allows a purchaser to use the same app, or widget or browser extension or installed service, to purchase from any retailer with installed collaborating software.

15 Claims, 4 Drawing Sheets

SECURE UNIVERSAL TWO-STEP PAYMENT AUTHORIZATION SYSTEM

CROSS REFERENCES TO RELATED APPLICATIONS

The present application claims priority to U.S. Provisional Patent Application No. 61/820,340 filed on May 7, 2013, which is hereby incorporated by reference in its entirety.

FIELD OF THE INVENTION

The present invention relates in general, to authentication and authorization for electronic payment, and particularly, to methods for completing purchase transactions through a mobile or fixed communication device.

BACKGROUND OF THE INVENTION

The proliferation of smartphones and tablet computers has brought electronic commerce into the next level—mobile commerce. A main driver for new devices and new applications (apps) is convenience. Automation or the ease of replacing a complicated task with a simplified alternative for the human user has been the impetus for numerous innovations. This trend is demonstrated in Apple's devices such as iPhones and MacBook computers.

A purpose of the current invention is to speed up and make secure 2 types of purchase made via electronic payment. The first type is purchases made in a retail store; the second type is online purchases via an Internet-connected computer. For both types of purchase, there are 2 essential steps: (1) entry of payment card (credit card, debit card, prepaid card, etc.) data, (2) authentication and authorization for the use of a payment card. For in-store purchases, data entry is commonly accomplished by swiping a plastic payment card; for online purchases, data entry is often accomplished by manual input. For both types of purchase, it is possible to add an optional confirmation.

In the rest of this specification, the first step is referred to as PDE (payment data entry); the second step is referred to as AA (authentication and authorization); the third and optional step is referred to as confirmation.

In a typical in-store purchase, PDE and AA take place at a POS (point-of-sale) counter with the assistance of a POS operator or a sales agent. After PDE (swiping the plastic card, for example), the POS system contacts a payment system operator to request payment AA.

For a purchaser with a mobile communication device installed with a special app, the 2-step task is simplified to "scan and approve." For example, Starbucks provides the "My cards" app to expedite data entry. In a store, a sales agent scans the barcode generated by an app on a mobile device. The scan result is then relayed to the POS system to complete payment AA. Such a solution is referred to as a barcode solution in this specification.

The barcode solution speeds up PDE and adds security to a transaction because a purchaser does not have to remove a payment card from his purse. The barcode solution is attractive because barcodes are well understood and have been adopted around the world.

However, there are a number of issues that hinders large-scale adoption of the barcode solution. First, such apps are only available from a few retailers. Second, the stores must be equipped to perform scanning functions. The retailers often attach their apps to a rewards program to drive customer retention. Often, a customer has to register and administer his account for each retailer. As the number of these apps increases, it becomes a burden for users to keep track of the apps and the associated accounts.

An alternative to the barcode solution is the wireless solution in which a mobile communication device sends payment data wirelessly to a POS system. In the wireless solution, data exchange takes place between a mobile communication device and a POS system over a short distance. For this solution, a retailer has to upgrade its POS system to enable wireless data exchange.

Consider the scenario that a purchaser is standing in line waiting for check out. While waiting is undesirable, a purchaser may not want to speed up the payment process. For one thing, he may still change his mind about the purchase before the actual check out. Once at the check out counter, the purchaser is no longer interested in a wireless solution because a barcode scanner is readily available at the counter. Finally, a potential problem is that the wireless solution exposes private data to wireless security threats.

Among the wireless solutions, the use of NFC (near-field communication) seems attractive. However, the practical distance for today's NFC technologies is between 5 cm to 20 cm. At such distance, a purchaser is very close to a POS terminal—the barcode solution is readily available and cheaper. Further, NFC is susceptible to security threats; it is easy to sniff NFC radio signals with today's technology.

NFC-based solutions are attractive in a crowded arena—for example, automatic ticketing in a sports arena, theater, amusement park, or public transportation vehicle. These solutions require both a mobile device and a POS terminal to be NFC capable, a requirement that may not be satisfied for many consumers and retailers.

Barcode solutions are the cheapest, requiring the least amount of investment for both retailers and consumers. As barcode scanners have been universally adopted, the price of a barcode scanner is low. For most retailers, the added hardware cost is zero.

The barcode solution allows for easy adoption, as it is a software-only solution. The POS system must be installed with payment software. For consumers, a special app, or widget or browser extension or installed service, for a mobile or fixed device is available for free. An added advantage of this approach is that it is unlikely for barcode scanners to be replaced by alternate equipment anytime soon.

BRIEF SUMMARY OF THE INVENTION

It is an object of the present invention to provide a system and method, called USA (universal secure authentication), to expedite and make secure PDE, AA, and optional confirmation, for both in-store and online purchases.

A USA app, or widget or browser extension or installed service, on a mobile or fixed communication device, is employed as an interface between a purchaser and the POS system of a merchant. A USA app, or widget or browser extension or installed service, is supported by a USA server system to complete the tasks associated with the present invention. An operator of a USA server system is called a USA service provider. A retailer with collaborating software installed on its POS system that enables communication between the retailer's POS system and a USA server system is called a collaborating retailer.

The USA system is not restricted to enabling purchases from a designated retailer—instead, the USA system enables purchases from any retailers that have collaborating software installed on their POS systems.

In a retail store, a USA app, or widget or browser extension or installed service, on a mobile communication device, generates a barcode to uniquely identify a payment card selected by a purchaser; a retailer's POS operator scans the barcode with a barcode scanner. The retailer's POS system uses the barcode scan image to identify a payment card for payment AA.

For an online purchase, a USA app or widget or browser extension or installed service, on a mobile or fixed communication device, generates a barcode to uniquely identify a payment card selected by a purchaser. The barcode is sent to the POS system of an online retailer to complete payment AA.

Optionally, a retailer does not store payment card data in its POS system, the barcode scan image is directly sent to a payment system operator for payment AA.

There are 2 options for performing payment AA. In the first option, the POS system of a retailer makes payment AA request to a payment system operator; in the second option, a USA server system makes payment AA request directly to a payment system operator.

There are 2 options for sending payment card data to a payment system operator. In the first option, the normal payment card data (such as payment card type, payment card account number, payment card name, etc.) is sent to a payment system operator. In the second option, only a barcode is sent to a payment system operator.

Optionally, before a payment system operator is contacted for payment AA, a USA server system sends a request message "confirm-to-purchase" to the purchaser of an in-store or online purchase, through a USA app, or widget or browser extension or installed service, on a mobile or fixed communication device. The purchaser has to reply with a message confirming or cancelling the purchase back to the USA server system.

Optionally, a USA app or a USA server system requires the use of a purchaser's biometric data on a mobile or fixed communication device or a wearable device to complete payment AA.

Optionally, a USA server system operator is a payment system operator or an agent of a payment system operator.

BRIEF DESCRIPTION OF THE DRAWINGS

The above and other objects and features in accordance with the present invention will become apparent from the following descriptions of embodiments in conjunction with the accompanying drawings, and in which.

DETAILED DESCRIPTION OF EXEMPLARY EMBODIMENTS

Figure 1:
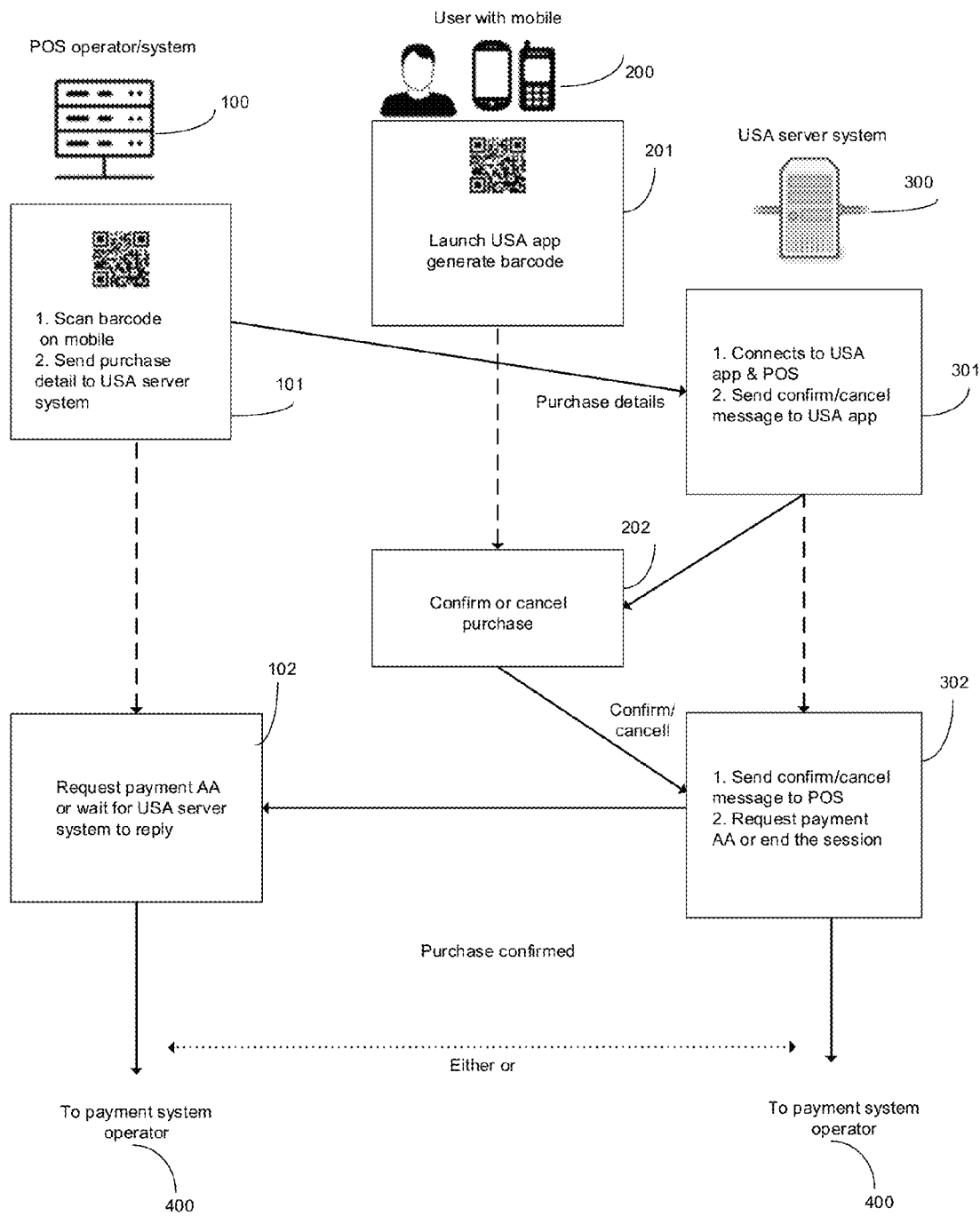
FIG. 1 is a flowchart illustrating the actions and data flow in an in-store purchase with a mobile communication device.

The present invention is a system and method referred to as a USA (universal secure authentication) service. A USA service is a modified barcode solution to expedite and make secure PDE, AA, and optional confirmation, for both in-store and online purchases. An operator that provides a USA service is said to be a USA service provider. A USA service provider is supported by a USA server system. A retailer is said to be a collaborating retailer if its POS system is installed with USA software that allows communication between a USA server system and its POS system to perform the work of a USA service.

The system and method is "universal" in that a purchaser is able to use a USA service to make purchases from any collaborating retailers (online or in-store) with any payment card. It is secure as it allows an optional confirmation to complete payment AA.

A USA service makes the selection of a payment method easy—a purchaser does not have to remove a payment card from his purse. A USA service allows a purchaser to avoid manual data entry for a payment card—for in-store purchases, card swiping is avoided; for online purchases, manual data entry is avoided. This provision makes the PDE process easy and more fault-tolerant. As a result, the PDE process is accelerated.

A purpose of the present invention is to make all communication of payment card data secure and in compliance with PCI DSS (payment card industry data security standard). According to one aspect of the present invention, it is unnecessary for a collaborating retailer or a USA service provider to store payment card data. For each purchase, the payment card data is communicated to the POS system of a retailer in the form of a barcode. This barcode may be sent directly to a payment system operator for AA. Therefore, even if the POS system of a retailer or a USA server system is hacked, only the barcodes stored in either system will be lost to the hack.

Optionally, a barcode generated by a USA service is a UUID code (universally unique identifier) based on a payment card selected by a purchaser. Optionally, a USA service generates a UUID by encoding the payment card data with a onetime pad (or encryption key)—this will make the encrypted barcode perfectly secret. The onetime decryption key for each payment card may be stored at 3 possible places: the POS system of a collaborating retailer, a USA server system, or the server system of a payment system operator.

Hereafter, a mobile communication device is a handheld computing-communication device that connects to the Internet wirelessly. A fixed communication device is a computing-communication device that connects to the Internet through a fixed line. A wearable device is a consumer item that can be worn and is equipped with computing and communication technology. Examples of a wearable device include Apple's iWatch and the Google glass.

Hereafter, a payment card system is meant to be an electronic payment system with or without a payment card, plastic or non-plastic. Such a system could be credit-based or debit-based, or a combination of both.

A transaction-acquiring financial institution or processor (the "acquirer") is a payment system operator that executes payment AA. An "acquirer" either approves a transaction or routes a transaction to a payment-card account issuer (the "issuer") for further approval or denial of the transaction. Hereafter, a payment system operator is meant to be a transaction acquirer, an issuer, or any financial institutions that approves and executes electronic payment.

In accordance with one aspect the current invention, a USA system or service comprises 2 necessary components: (1) a USA app, or widget or browser extension or installed service, which is responsible for PDE, and (2) a USA server system, which is responsible for AA-C (authentication-authorization with confirmation).

A USA system or service is not restricted to work with a designated retailer with a designated set of payment systems. Any retailer (in-store or online) can work with a USA service provider by installing USA software on its POS system and become a collaborating retailer of the USA service.

In a USA service or system, a mobile or fixed communication device is installed with a USA app, or widget, or browser extension, or installed service. The USA app, or widget or browser extension or installed service, generates a special barcode for each payment card selected by a user.

A USA server system may make payment-AA request directly to a payment system operator to obtain a payment approval or denial code. Once the USA server system receives an approval or denial code, it relays the code to the POS system that is working on the current purchase. Otherwise, the POS system of a retailer makes payment-AA request directly to a payment system operator.

For an in-store purchase, a sales agent scans the barcode generated by a USA app, or widget or browser extension or installed service, on a mobile communication device held by a purchaser. For an online purchase, a USA app, or widget or browser extension or installed service, generates a barcode, which is either copied-and-pasted onto a web page, or is sent directly to the POS system of the online retailer.

For both in-store and online purchases, the POS system recognizes the barcode and associates the barcode with a payment card of the purchaser. The POS system may send the associated payment card data along with the transaction details (the purchase description, the purchase amount, etc.) to a USA server system. For each payment card, its detailed data (payment card account number, expiration date, security code, etc.) may be stored in the POS system of a collaborating retailer, or a USA server system, or both.

Optionally, a barcode generated by a USA system is an encoded UUID (universally unique identifier). UUID is an identifier standard used in software construction, standardized by the Open Software Foundation. Optionally, after a barcode is scanned, a POS system uses the decoded UUID as the key to retrieve the stored payment card data for the purchase, if the POS system stores such data. The POS system may also send the decoded UUID to a USA server system. At a USA server system, a decoded UUID may be used as the key to retrieve the stored payment card data for the purchase.

According to one aspect of the present invention, the POS system of a collaborating retailer may not store payment card data for each purchase in an explicit form; in addition, the server system of a USA service may not store the payment card data for each purchase in an explicit form. The POS system of a collaborating retailer may store payment card data for each purchase only in the form of a barcode; similarly, the server system of a USA service may store the payment card data for each purchase in the form of a barcode. Each barcodes so stored may be encrypted with a onetime pad (encryption key).

Optionally, a USA app, or widget or browser extension or installed service, on a fixed or mobile communication device, requires a PIN (personal identification number) or PIC (personal identification code) or biometric data from a purchaser for high-value purchases over a fixed dollar amount. The threshold may be zero—in this case, a PIN or PIC is needed for each purchase. The optional requirement may be triggered by a POS system, a USA app, or widget or browser extension or installed service, or a USA server system.

Optionally, before a payment system operator is contacted for payment AA, a USA server system sends a request message "confirm-to-purchase" to the purchaser, through a USA app, or widget or browser extension or installed service, on a mobile or fixed communication device used by the purchaser. The USA app, or widget or browser extension or installed service, prompts the purchaser to confirm or cancel the purchase with a simple input. The USA app, or widget or browser extension or installed service, then sends a reply message, confirming or cancelling the purchase, back to the USA server system.

Optionally, a barcode generated by the USA system is an encrypted code using an encryption key. The decryption keys may be stored at a USA server system, or the POS system of a collaborating retailer, or a server system of a payment system operator. Optionally, an encryption key and its decryption key are for one-time use—a new set of keys is generated for each transaction.

Optionally, a USA service user is given a user account in a USA server system. After a payment system operator approves a purchase, the USA server system stores the new purchase details in the user's account. This action enables value-added services through the USA server system to the USA customer. For example, e-reward, e-coupon, expense handling, and transaction reporting can be part of the value-added services.

Optionally, a USA system is configured to provide repeat-purchase (such as monthly or quarterly repurchase) or installment payments to merchants.

FIG. 1 shows a flowchart of actions and data in a USA system for an in-store purchase. In step 201, the purchaser 200 launches a USA app on his mobile communication device, and the USA app generates a barcode. In step 101, the POS operator 100 scans the barcode, and the POS system 100 sends the purchase details with payment data to a USA server system 300. In step 301, the USA server system 300 sends a confirmation request to the purchaser through the USA app on his mobile device. In step 202, the purchaser 200 confirms or cancels the purchase, and the USA app sends a message to the USA server system 300 confirming or canceling the purchase. In step 302, the USA server system 300 sends a message confirming or canceling the purchase to the POS system 100, and optionally contacts a payment operator 400 for payment AA. In step 102, having received a confirmed message from the USA server system 300, the POS system 100 optionally contacts a payment system operator 400 for payment AA.

If the purchase amount is greater than a threshold, in step 301, the USA server system request optional biometric data from the purchaser to confirm the purchase.

Figure 2:
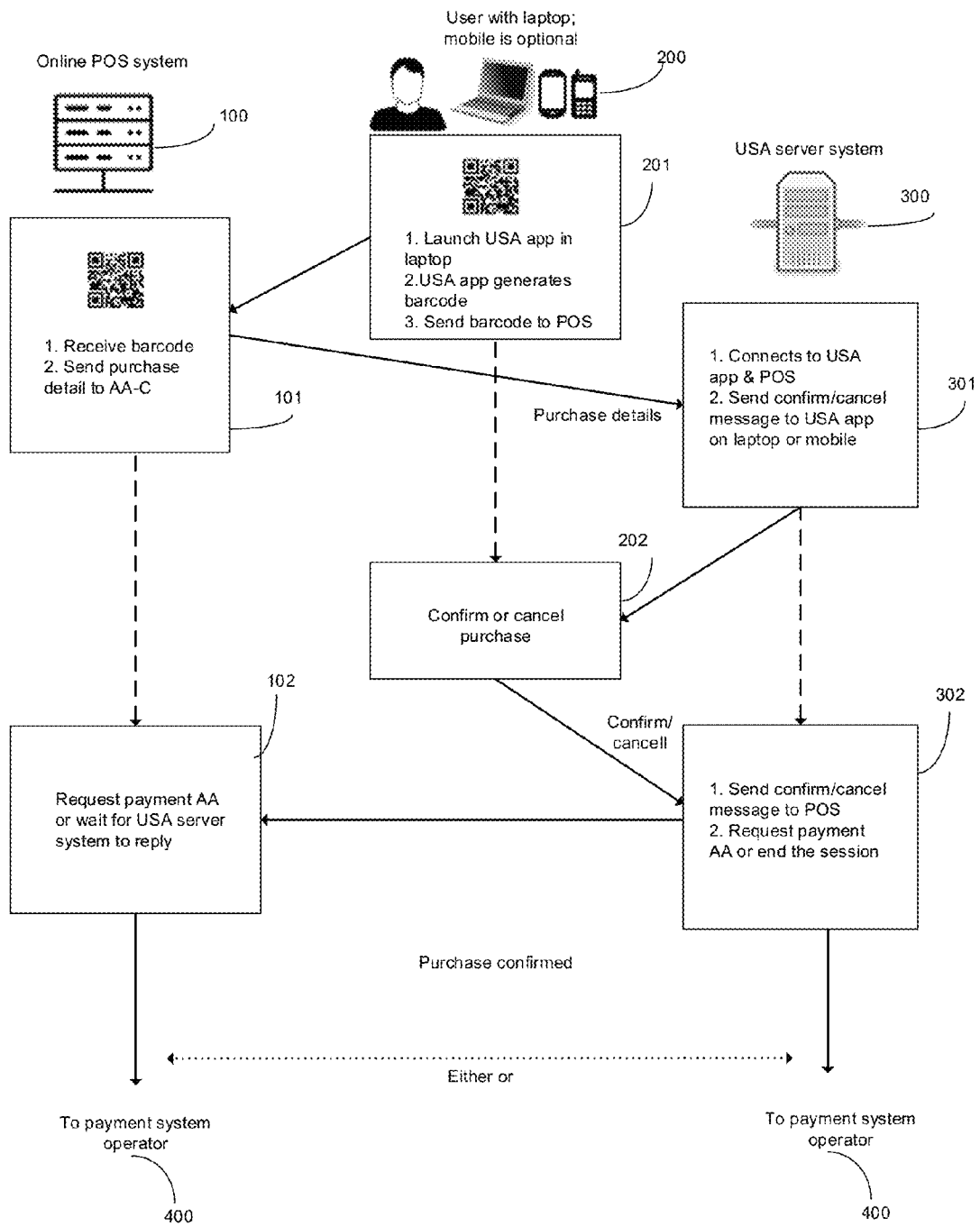
FIG. 2 is a flowchart illustrating the actions and data flow in an online purchase with a laptop computer and a mobile communication device.

FIG. 2 shows a flowchart of actions and data in a USA system for an online purchase. In step 201, the purchaser 200 launches a USA app on his laptop computer, and the USA app generates a barcode and sends the barcode to the online POS system 100. Also in step 201, the USA app connects to a USA server system 300. In step 101, the POS system 100 sends purchase details with payment data to a USA server system 300. In step 301, the USA server system 300 connects to the USA app and the POS system 100. Also in step 301, the USA server system 300 sends a confirmation request to the purchaser through the USA app on his mobile or fixed device. In step 202, the purchaser 200 confirms or cancels the purchase. Also in step 202, the USA app sends a message to the USA server system 300 confirming or canceling the purchase. In step 302, the USA server system 300 sends a message confirming or cancelling the purchase to the POS system 100, and optionally contacts a payment operator 400 for payment AA. In step 102, having received a confirmed message from the USA server system 300, the POS system 100 optionally contacts a payment system operator 400 for payment AA.

Figure 3:
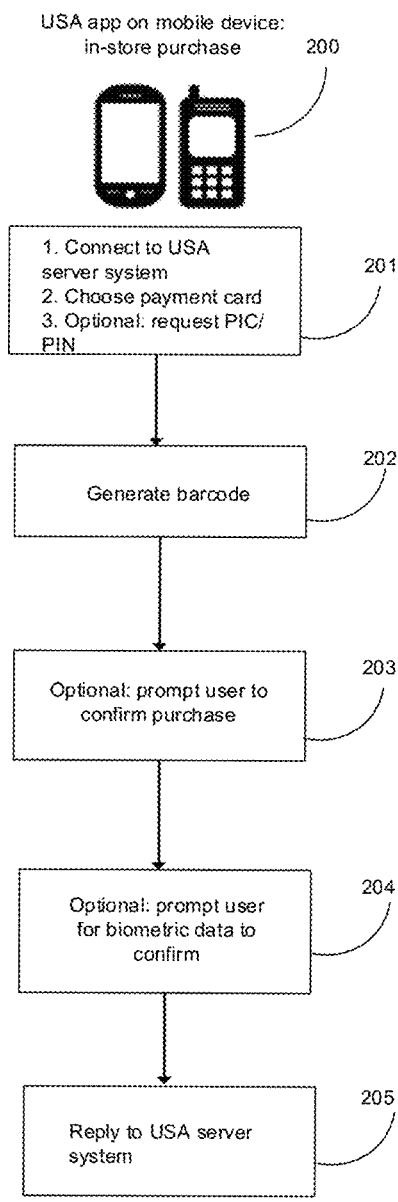
FIG. 3 depicts the steps of a USA app installed on a mobile communication device to complete an in-store purchase.

FIG. 3 shows the steps for a USA app 200 to complete in a mobile communication device for an in-store purchase. In step 201, the user chooses a payment card. If the user does not specify a specific card, the USA app 200 chooses a default payment card. In step 201, optionally, the USA app 200 requests a PIC or PIN to be entered by the purchaser. In step 202, the USA app 200 generates a barcode to be scanned. In step 203, the USA app 200 on the mobile device may prompt the user to confirm the purchase. In step 204, the USA app 200 may prompts the user to confirm the purchase by biometric data. In step 205, a confirmation message is sent back to the USA server system.

Figure 4:
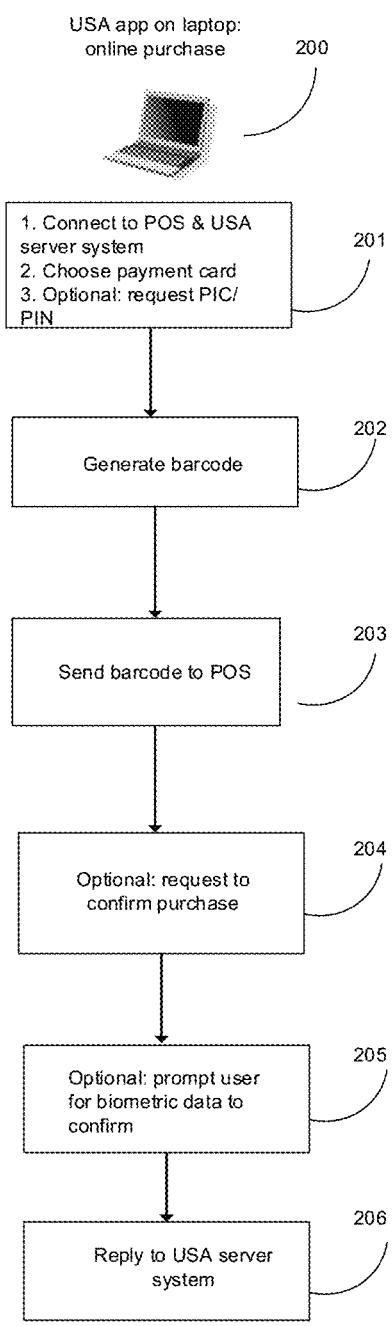
FIG. 4 depicts the steps of a USA app installed on a laptop computer to complete an online purchase.

FIG. 4 shows the steps for a USA app 200 in a laptop computer to complete an online purchase. In step 201, the USA app 200 establishes a connection with an online POS system. Also in step 201, if the user does not specify a specific card, the USA app 200 chooses a default payment card. In step 201, optionally, the USA app 200 requests a PIC or PIN to be entered by the purchaser. In step 202, given the chosen payment card, the USA app 200 generates a barcode. At step 203, the barcode is sent to the POS system of the online retailer. In step 204, the USA app 200 may prompt the user to confirm the purchase. In step 205, the USA app 200 may prompt the user to confirm the purchase by biometric data. In step 206, the USA app 200 sends the confirmation message back to the USA server system.

What is claimed is:

1. A commercial entity subsystem in communication with an electronic device, a merchant subsystem, and a financial institution subsystem, the commercial entity subsystem comprising:
   at least one processor component;
   at least one memory component; and
   at least one communications component, wherein the commercial entity subsystem is configured to:
   receive from the merchant subsystem an encrypted digital representation of a commerce credential for a payment transaction, the commerce credential including at least the financial value of said transaction, and the commerce credential containing no payment credentials usable in any other future transaction;
   after the receiving, decrypt the digital representation received from the merchant subsystem, using at least a stored decryption key in the memory component;
   after the decrypting, send a payment authorization request to the financial institution subsystem using at least the received digital representation as a basis for a payment credential;
   receive an approval-or-denial reply from the financial institution subsystem regarding the payment authorization request, and forward the approval-or-denial reply to the merchant subsystem, or the electronic device, or both;
   generate a onetime encryption-decryption key pair for a new transaction, comprising an encryption key and a corresponding decryption key;
   after the generating, send the encryption key to the electronic device;
   after the generating, store the decryption key in the memory component.

2. The commercial entity subsystem of claim 1, wherein the commercial entity subsystem is further configured, for each transaction, to store no payment credentials in an explicit form, except in the form of a said digital representation received from the merchant subsystem.

3. An electronic device in communication with a commercial entity subsystem and a merchant subsystem, the electronic device comprising:
   at least one processor component;
   at least one memory component; and
   at least one communications component, wherein the electronic device is configured to:
   start an electronic payment process for a payment transaction;
   after the starting, generate a digital representation of a commerce credential which at least identifies said payment transaction, the commerce credential containing no payment credentials usable in any other future transaction;
   after the generating, encrypt the generated digital representation using an encryption key, which is received from the commercial entity subsystem for the transaction;
   after the encrypting, communicate the encrypted digital representation to the merchant subsystem;
   after the communicating, receive an approval-or-denial notice for said payment transaction from the commercial entity subsystem;
   receive from the commercial entity subsystem a new encryption key for each transaction.

4. The electronic device of claim 3, wherein said digital representation is a barcode.

5. The electronic device of claim 3, wherein said digital representation is communicated to the merchant subsystem through optical scanning on a barcode displayed on a display screen.

6. A merchant subsystem in communication with a commercial entity subsystem and an electronic device, the merchant subsystem comprising:
   at least one processor component;
   at least one memory component; and
   at least one communications component, wherein the merchant subsystem is configured to:
   receive from the electronic device an encrypted digital representation of a commerce credential for a payment transaction, the commerce credential containing no payment credentials usable in any other future transaction;
   generate a transaction report for a purchase corresponding to the payment transaction, the report including at least the financial value of the purchase;
   after the receiving and the generating, send a payment authorization request through the commercial entity subsystem, the request including the received digital representation and said generated report, to the financial institution subsystem;
   receive an approval-or-denial reply for the payment request regarding the purchase from the commercial entity subsystem.

7. The merchant subsystem of claim 6, wherein said digital representation is a barcode.

8. The merchant subsystem of claim 6, wherein said digital representation is communicated to the merchant subsystem through optical scanning on a barcode displayed on a display screen.

9. A commercial entity subsystem in communication with an electronic device, a merchant subsystem, and a financial institution subsystem, the commercial entity subsystem comprising:
- at least one processor component;
- at least one memory component; and
- at least one communications component, wherein the commercial entity subsystem is configured to:
- receive an encrypted digital representation of at least a payment commerce credential from the merchant subsystem, the digital representation at least identifying a payment transaction, and the commerce credential containing no payment credentials usable in any other future transaction;
- after the receiving, decrypt the received digital representation;
- after the decrypting, perform a confirmation process for which the commercial entity subsystem is further configured to:
- send a request to the electronic device requesting at least a credential from the user of the electronic device;
- send a request to the electronic device requesting the user of the electronic device to confirm said payment transaction;
- after receiving from the electronic device a confirmation for said payment transaction, send a payment authorization request to the financial institution subsystem, using at least the received digital representation as a basis for a payment credential.

10. The commercial entity subsystem of claim 9, wherein said requested user credential includes a personal identification number, or a personal identification code, or a biometric identifier.

11. The commercial entity subsystem of claim 9, wherein said encrypted digital representation is encrypted with a single-transaction encryption key, said encryption key being previously generated by the commercial entity subsystem.

12. The commercial entity subsystem of claim 9, wherein the commercial entity subsystem decrypts said encrypted digital representation using a stored decryption key.

13. The commercial entity subsystem of claim 9, wherein the commercial entity subsystem is further configured, for each transaction, to store no payment credentials in an explicit form, except in the form of a said digital representation received from the merchant subsystem.

14. A commercial entity subsystem in communication with an electronic device, a merchant subsystem, and a financial institution subsystem, the commercial entity subsystem comprising:
- at least one processor component;
- at least one memory component; and
- at least one communications component, wherein the commercial entity subsystem is configured to:
- receive from the merchant subsystem an encrypted digital representation of a commerce credential for a payment transaction;
- store, for each transaction, no payment credentials in an explicit form, except in the form of a said digital representation received from the merchant subsystem;
- after the receiving, decrypt the digital representation received from the merchant subsystem, using at least a stored decryption key in the memory component;
- after the decrypting, send a payment authorization request to the financial institution subsystem using at least a payment credential, the payment credential being included in the said received digital representation after decryption;
- receive an approval-or-denial reply from the financial institution subsystem regarding the payment authorization request, and forward the approval-or-denial reply to the merchant subsystem, or the electronic device, or both;
- generate a onetime encryption-decryption key pair for a new transaction, comprising an encryption key and a corresponding decryption key;
- after the generating, send the encryption key to the electronic device;
- after the generating, store the decryption key in the memory component.

15. The commercial entity subsystem of claim 14, wherein said encrypted digital representation is a barcode.

* * * * *